(12) United States Patent
Zehavi

(10) Patent No.: US 6,928,123 B2
(45) Date of Patent: Aug. 9, 2005

(54) WIRELESS NETWORK WITH ENHANCED DATA RATE

(75) Inventor: Ephraim Zehavi, Haifa (IL)

(73) Assignee: Intel Corporation, Santa Clara, CA (US)

( * ) Notice: Subject to any disclaimer, the term of this patent is extended or adjusted under 35 U.S.C. 154(b) by 344 days.

(21) Appl. No.: 09/835,284

(22) Filed: Apr. 12, 2001

(65) Prior Publication Data

US 2002/0040383 A1 Apr. 4, 2002

Related U.S. Application Data

(60) Provisional application No. 60/197,984, filed on Apr. 17, 2000.

(51) Int. Cl.$^7$ ............................................. H04L 27/36
(52) U.S. Cl. ...................... 375/298; 375/308; 332/104; 341/61
(58) Field of Search ................................. 375/261, 265, 375/298, 308; 341/61, 143; 714/759, 786, 794; 332/103

(56) References Cited

U.S. PATENT DOCUMENTS

| | | | |
|---|---|---|---|
| 4,569,421 A | | 2/1986 | Sandstedt |
| 5,465,267 A | * | 11/1995 | Todoroki ..................... 375/279 |
| 5,559,561 A | * | 9/1996 | Wei ............................. 348/470 |
| 5,633,881 A | | 5/1997 | Zehavi et al. .............. 371/37.5 |
| 5,636,251 A | * | 6/1997 | Citta et al. .................. 375/341 |
| 5,838,798 A | | 11/1998 | Stevens, III |
| 5,909,454 A | * | 6/1999 | Schmidt ........................... 1/1 |
| 5,930,230 A | * | 7/1999 | Odenwalder et al. ....... 370/208 |
| 5,965,861 A | | 10/1999 | Addy et al. |
| 5,978,772 A | | 11/1999 | Mold |
| 5,979,757 A | | 11/1999 | Tracy et al. |
| 6,105,867 A | | 8/2000 | Shimizu et al. |
| 6,385,652 B1 | | 5/2002 | Brown et al. |
| 6,621,872 B1 | * | 9/2003 | Jones et al. ................. 375/265 |

FOREIGN PATENT DOCUMENTS

EP  0 982 892 A2 *  3/2000

OTHER PUBLICATIONS

J. Kardach, *Bluetooth Architecture Overview*, Intel Corp., 1998, 51 pages.

"Wspan/Bluetooth T Specification Serves as Foundation for IEEE 802.15 WPAN Work", Press Release, Jan. 25, 2000, 2 pages. (http://www.manta.ieee.org/groups/802/15/arc/802–wpanlist/msg00088.html).

(Continued)

*Primary Examiner*—Young T. Tse
(74) *Attorney, Agent, or Firm*—James S. Finn

(57) ABSTRACT

A high-speed transmitter for digital data having a variable data rare, the transmitter comprising a convolutional encoder, adapted to generate, for each group of k input bits in a bitstream, n coded output bits, such that k and n are integers, n equal to or greater than k, and at least one of k and n is variable responsive to the variable data rate of the transmitter; and a modulator, coupled to map the output bits generated by the encoder to a constellation of M symbols for transmission by the transmitter, M an integer, which is variable responsive to the variable data rate of the transmitter; and wherein for a given rate Rs of transmission of the symbols by the transmitter, the variable data rate Rb is given by Rb=Rs*log 2(M)*Rc, wherein Rc is a code rate equal to k/n.

13 Claims, 5 Drawing Sheets

OTHER PUBLICATIONS

"Bluetooth™ Specification Serves as Foundaation for IEEE 802.15 WPAN Standard", Mar. 13, 2000, 2 pages. (http://standards.ieee.org/announcements/bluespec.html).

"Lesson 137: Wireless LANs", NetworkMagazine.com, Dec. 1999, 7 pages. (http://www.networkmagazine.com/magazine/tutorial/hardware/9912tut.htm).

"IEEE 802 Wireless Vision Statement", Jul. 1999, one page. (http://www.ietf.org/proceedings/99jul/slides/mobileip–802_15–99jul/sld003.htm).

"802 Focuses only on the Lower Layers", Jul. 1999, one page. (http://www.ietf.org/proceedings/99jul/slides/mobileip–802_15–99jul/sld014.htm).

"Bluetooth and IEEE 802", Jul. 1999, one page. (http://www.ietf.org /proceedings/99jul/slides/mobileip802_15–99jul/sld015.htm).

IEEE Standard 802.1 1b—1999 (Supplement to ANSI/IEEE Std 802.11, 1999 Edition), Approved Sep. 16, 1999, IEEE Inc., New York, 96 pages.

* cited by examiner

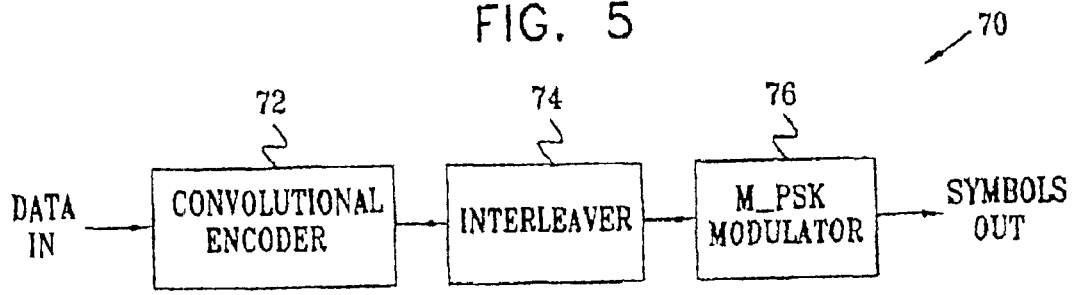
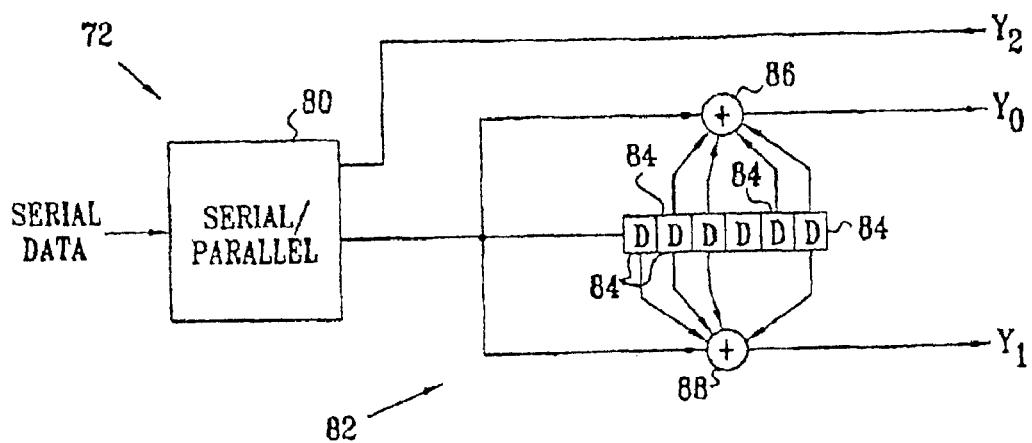
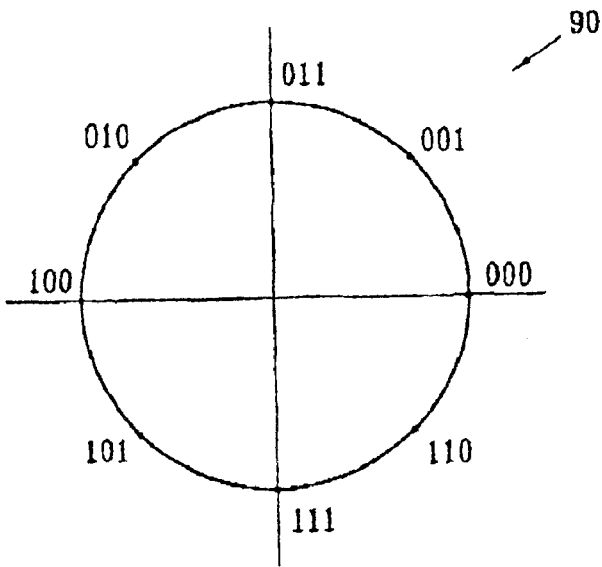

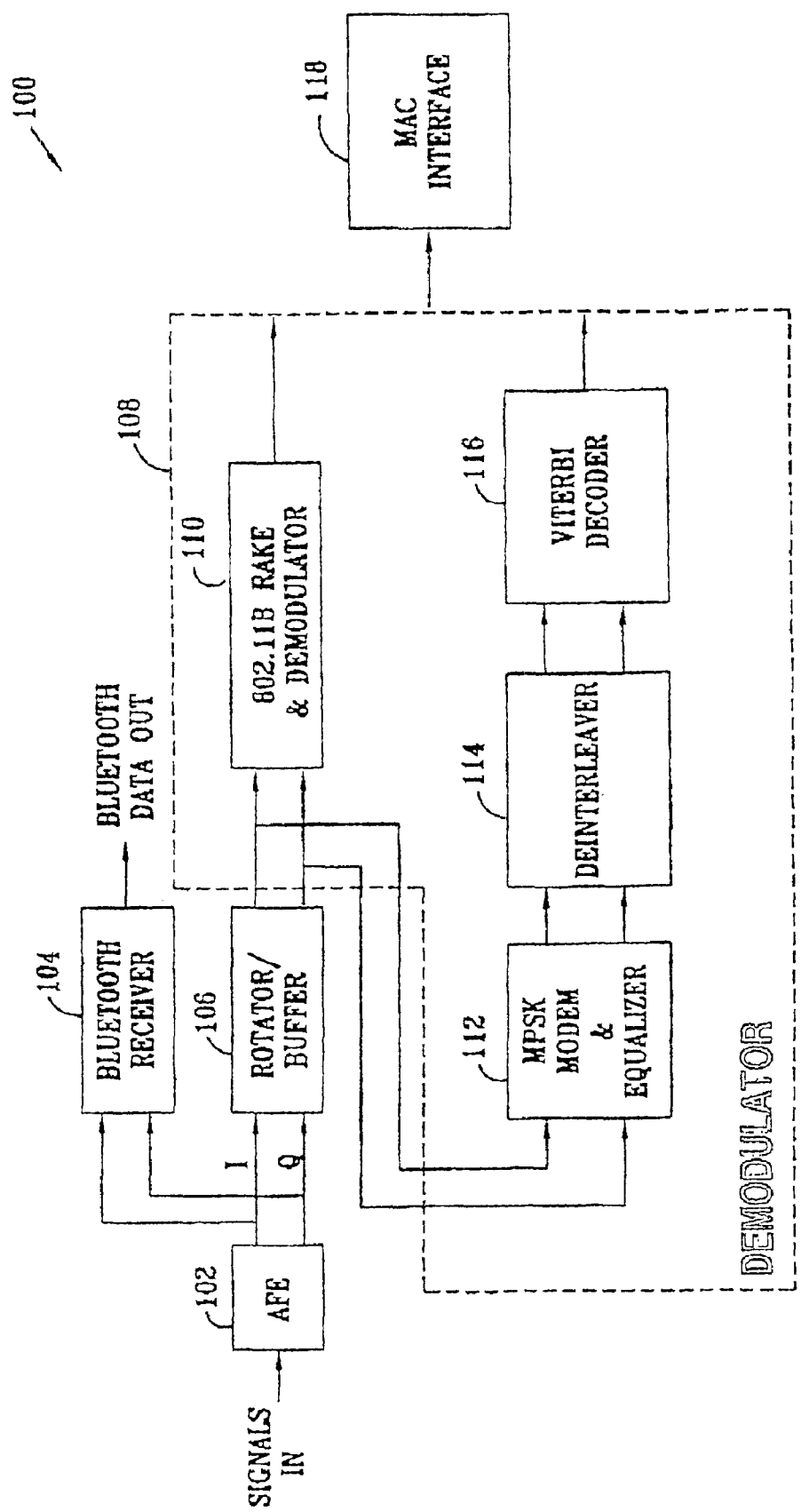

WIRELESS NETWORK WITH ENHANCED DATA RATE

CROSS-REFERENCE TO RELATED APPLICATIONS

This application claims the benefit of U.S. Provisional Patent Application No. 60/197,984, filed Apr. 17, 2000, which is incorporated herein by reference.

FIELD OF THE INVENTION

The present invention relates generally to wireless data communication,, and specifically to high-speed wireless local area networks.

BACKGROUND OF THE INVENTION

Wireless local area networks (WLANs) are gaining in popularity, and new applications are being developed. The original WLAN standards, such as "Bluetooth" and IEEE 802.11, were designed to enable communications at 1–2 Mbps in a band around 2.4 GHz. More recently, IEEE working groups have defined the 802.11a and 802.11b extensions to the original standard, in order to enable higher data rates. The 802.11a standard envisions data rates over 20 Mbps over short distances in a 5 GHz band, while 802.11b defines data rates up to 11 Mbps in the 2.4 GHz band. For 11 Mbps operation, the 802.11b standard uses complementary code keying (CCK) or quadrature phase shift keying (QPSK) with packet binary convolutional coding (PBCC). These modulation schemes are further described in tho IEEE 802.11b standard, which is incorporated herein by reference.

Recently the IEEE 802.11 working group has called for proposals to extend the 802.11b standard data rates still further, to 22 Mbps and above. One proposal that has been put forth, by Kodak and Motorola, is based on a wideband binary frequency shift keying (BFSK) scheme, with a bandwidth of up to 28 MHz. While this proposal in itself can be implemented in a straightforward way, using analog signal processing, it is not compatible with existing, lower-rate receivers or with Bluetooth protocols. Furthermore, it will typically enable high data-rate communication only over very short distances, on the order of 2 m.

Convolutional coding, as mentioned above, is widely used in communication applications to reduce the bit error rate (BER) in signals sent over noisy channels. Pragmatic trellis coded modulation (PTCM) is a particularly useful type of convolutional coding, which has the advantages of reduced computation load and efficient implementation in VLSI devices. PTCM encoders and decoders are capable of handling different modulation techniques, such as binary phase shift keying (BPSK), QPSK, 8-PSK and 16-PSK (referred to collectively as M-PSK techniques). An exemplary trellis encoder and decoder based on PTCM are described in U.S. Pat. No. 5,633,861, whose disclosure is incorporated herein by reference.

SUMMARY OF THE INVENTION

It is an object of some aspects of the present invention to provide improved devices and methods for high-speed wireless data communications, and particularly to provide devices capable of reaching data rates above 11 Mbps while maintaining downward-compatibility with the IEEE 802.11b standard.

It is a further object of some aspects of the present invention to provide improved methods and systems for conveying electronic images and other large data files over WLANs.

In preferred embodiments of the present invention, a high-speed wireless modem operates at an enhanced data rate by transmitting and receiving multiple bits of data per symbol, preferably using M-PSK modulation, most preferably together with PTCM. The modem automatically adjusts the number of bits per symbol upon initiation of communication over a wireless link, based on the quality of the link and the capabilities of the device with which it is communicating. The modem thus maintains compatibility with existing equipment that operates at lower bit-per-symbol rates. The increased number of bits per symbol is preferably facilitated by the use of a covering function, which rotates the M-PSK symbols in a pseudo-random fashion in order to reduce the effects of interference in demodulating received signals.

In some preferred embodiments of the present invention, the modem is compatible with the IEEE 802.11b standard, and operates at 11 Msps (million symbols per second). Preferably, the modem uses 8-PSK to transmit and receive data at 2 or 3 bits of data per symbol, thus achieving a data rate of 22 or 33 Mbps, unlike devices based on the current standard, which can operate at no more than 1 bit per symbol. These enhanced data rates are achieved with minimal modification to the standard, and without restricting the transmission range of the modem relative to existing devices.

In some preferred embodiments of the present invention, the enhanced data rate (EDR) of the modem is used for transmitting electronic images from a portable digital camera to a storage or processing facility. In one such embodiment, one or more wireless service points, having EDR-capable modems, are deployed in a store or other commercial establishment. A customer, who wishes to have a hard copy, such as photographic prints, or other permanent record made of images stored in his or her digital camera, brings the camera within range of one of the service points. The camera establishes a wireless link with the service point and transmits the image data over the link to the service point, preferably at 22 or 33 Mbps. The service point then convoys the images, preferably via WLAN, to a service center, where the prints (or other media) are produced. The customer stops by the service center later, typically upon exiting the store, to pick up the prints.

In another, similar embodiment, a WLAN in the store (or other establishment) is configured to operate at the enhanced data rate. In this case, the camera can establish a wireless link at the EDR to transfer the images over the WLAN to the service center from substantially any point in the store.

Although these preferred embodiments relate specifically to transmission of digital images in a commercial environment, it will be appreciated that the principles of the present invention can similarly be used in other applications and services in which large volumes of data must be transferred over wireless networks at high speed.

There is therefore provided, in accordance with a preferred embodiment of the present invention, apparatus for customer service, including:

at least one wireless communication terminal, adapted to be deployed at a first location in a facility that is visited by customers, so as to receive digital data over a wireless link from a portable device carried by at least one of the customers in a vicinity of the terminal; and a service center, at a second location, which is not in the vicinity of the at least one wireless communication terminal, and in communication with the terminal so as to receive the digital data therefrom and to generate a permanent record of the data for delivery to the at least one of the customers.

In a preferred embodiment, the digital data include one or more digital images, the portable device includes a digital camera, and the permanent record includes a hard copy of one or more of the images. Typically, the facility includes a commercial establishment, and wherein the first location is in a shopping area of the establishment, while the second location is near an exit from the establishment.

In a further preferred embodiment, the wireless link belongs to a wireless local area network deployed in the facility.

Preferably, the wireless communication terminal is adapted to receive the data at a rate substantially in excess of 11 Mbps. Most preferably, the wireless communication terminal is further adapted to transmit and receive at a rate of 11 Mbps or less substantially in accordance with IEEE standard 802.11, and to receive the data at the rate substantially in excess of 11 Mbps when requested to do so by the portable device. Further preferably, the wireless communication terminal is adapted to receive the data at a symbol rate substantially equal to 11 million symbols per second. Optionally, the communication between the wireless communication terminal and the service center takes place at a rate of 11 Mbps or less.

There is also provided, in accordance with a preferred embodiment of the present invention, a method for customer service, including:

receiving digital data at a first location in a facility over a wireless link from a portable device carried by a customer in a vicinity of the first location;

transferring the digital data to a second location in the facility, which is not in the vicinity of the first location;

generating a permanent record of the data at the second location; and delivering the permanent record to the customer.

There is additionally provided, in accordance with a preferred embodiment of the present invention, a high-speed transmitter for digital data having a variable data rate, the transmitter including:

a convolutional encoder, adapted to generate, for each group of k input bits in the bitstream, n coded output bits, such that k and n are integers, n equal to or greater than k, and at least one of k and n is variable responsive to the variable data rate of the transmitter; and a modulator, coupled to map the output bits generated by the encoder to a constellation of M symbols for transmission by the transmitter, M an integer, which is variable responsive to the variable data rate of the transmitter.

Preferably, for a given rate $R_s$ of transmission of the symbols by the transmitter, the variable data rate $R_b$ is given by $R_b = R_s * \log_2(M) * R_c$, wherein $R_c$ is a code rate equal to k/n. Further preferably, the rate of transmission of the symbols is substantially fixed at a standard rate, which most preferably is substantially equal to 11 million symbols per second.

Preferably, the constellation includes a phase-shift-keyed constellation of order M. Most preferably, after mapping the output bits to the symbols, the modulator is adapted to rotate a phase of the symbols in accordance with a pseudo-random cover function.

Additionally or alternative, the encoder includes a sequence of delay stages coupled to receive the input bits in a serial stream, and a plurality of adders, which are coupled to receive the input bits from the delay stages and to add the input bits together so as to generate at least two of the coded output bits in parallel. Preferably, the modulator is configured to select the coded output bits from the encoder to be mapped to each of the symbols responsive to the variable data rate.

There is further provided, in accordance with a preferred embodiment of the present invention, a method for variable-rate, high-speed transmission of digital data, including:

specifying a first bit rate at which the data are to be transmitted by a transmitter;

applying convolutional encoding to the data so as to generate, for each group of k input bits in the bitstream, n coded output bits, such that k and n are integers, n equal to or greater than k;

modulating the output bits to generate a constellation of M symbols, M a variable integer, for transmission of the modulated data at a given symbol rate and at the first bit rate;

specifying a second bit rate at which the data are to be transmitted, different from the first bit rate; and changing a value of at least one of k, n and M, so that after applying the convolutional encoding and modulating the output bits using the changed value, the transmitter transmits the modulated data at the given symbol rate and at the second bit rate.

The present invention will be more fully understood from the following detailed description of the preferred embodiments thereof, taken together with the drawings in which:

BRIEF DESCRIPTION OF THE DRAWINGS

FIG. 5 is a block diagram that schematically illustrates elements of a wireless transmitter, in accordance with a preferred embodiment of the present invention;

FIG. 6 is a block diagram that schematically illustrates details of a convolutional encoder used in the transmitter of FIG. 5, in accordance with a preferred embodiment of the present invention;

FIG. 7 is a polar plot illustrating an 8-PSK modulation scheme, in accordance with a preferred embodiment of the present invention; and FIG. 8 is a block diagram that schematically illustrates elements of a wireless receiver, in accordance with a preferred embodiment of the present invention.

DETAILED DESCRIPTION OF PREFERRED EMBODIMENTS

Figure 1:
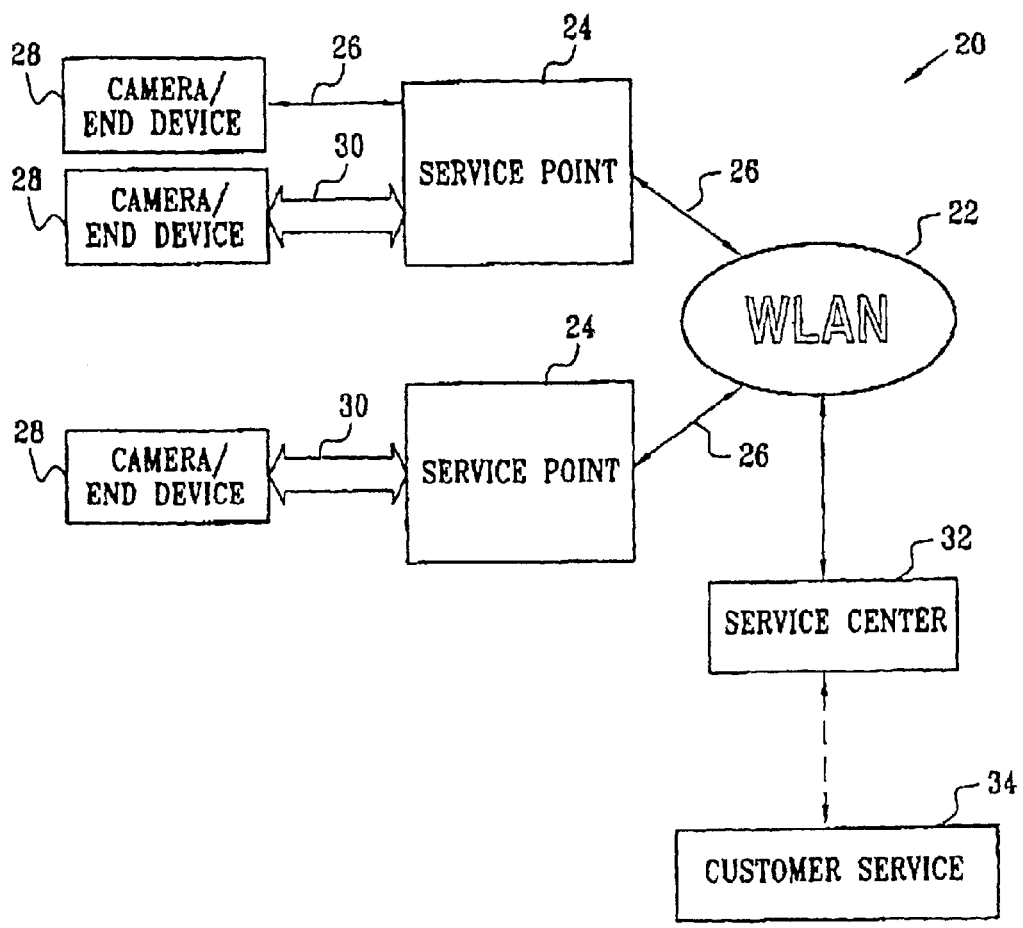
FIG. 1 is a block diagram that schematically illustrates a system, based on a WLAN, for providing hard copies of digital maces, in accordance with a preferred embodiment of the present invention.

FIG. 1 is a block diagram that schematically illustrates a system 20 for providing hard copies of digital images, in accordance with a preferred embodiment of the present invention. System 20 is typically deployed in a commercial establishment, such as a department store or shopping mall, and enables customers to submit their digital images via a WLAN 22 at multiple points in the establishment, while they are shopping. The customers then pick up their hard copies (or other media that they have requested, such as photo-CDs) when they are ready to check out of the establishment.

WLAN 22 preferably operates in accordance with the IEEE 802.11b standard, as described hereinabove, at a rate of 11 Mbps. Because of the large volume of data contained in digital images, however, one or more high-speed service points 24 are deployed in the establishment. The service points are equipped with wireless modems, as described hereinbelow, which are capable of operating at an enhanced data rate (EDR). Most preferably, the EDR is at least 22 Mbps. Service points 24 are designed to serve cameras 28 (or other user devices) that are similarly equipped with wireless modems, preferably modems that are also capable of EDR operation.

A customer wishing to submit images for hard copying positions his or her camera 28, with the images stored in the camera memory, within a prescribed range of one of service points 24. Preferably, the prescribed range is at least 10 m. When the customer actuates an appropriate control on the camera, the camera makes contact with the service point and negotiates an optimal data rate. The data rate depends on the capabilities of the camera and its modem, proximity to the service point, and noise conditions in the area of the service point. When possible, cameras 28 communicate with service points 24 at the EDR, as indicated by broad arrows 30. In this way, the customer's images are transferred rapidly to the service point, and the customer is freed to continue with his or her shopping. On the other hand, when EDR is not possible, the camera may communicate with the service point at a normal rate, such as 5.5 or 11 Mbps, as indicated by thin arrows 26.

Figure 2:
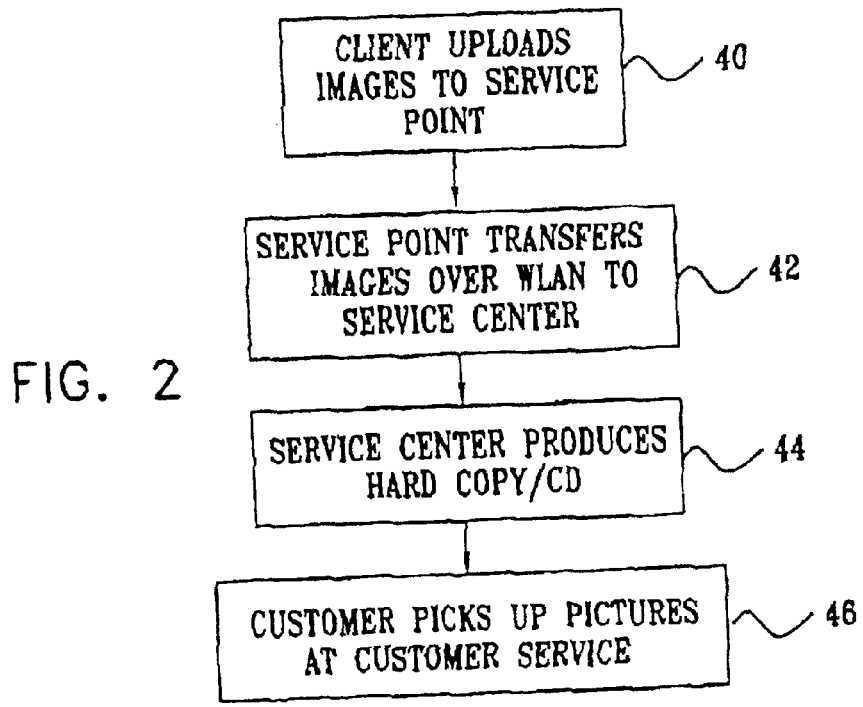
FIG. 2 is a flow chart that schematically illustrates a method for transferring digital images and producing hard copies in the system of FIG. 1, in accordance with a preferred embodiment of the present invention.
Figure 3:
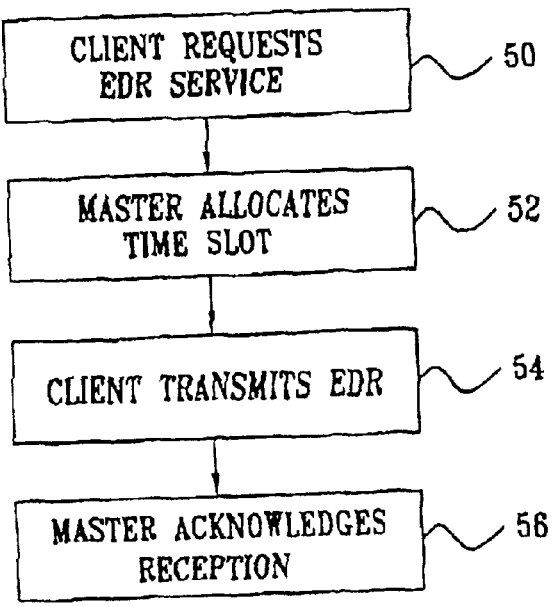
FIG. 3 is a flow chart that schematically illustrates a method for transmitting data at an enhanced data rate over a wireless connection, in accordance with a preferred embodiment of the present invention.

FIG. 2 is a flow chart that schematically illustrates a process by which images are transferred by the customer to a service center 32 in system 20 for hard copying, in accordance with a preferred embodiment of the present invention. At an upload step 40, a client device, in this case camera 28, uploads one or more image files from its memory to service point 24. Details of this step are shown in FIG. 3 and described with reference thereto. When the upload is complete, the service point signals the customer that the camera can be taken away.

At a transfer step 42, the service point passes the image files over WLAN 22 to a service center 32. Step 42 may overlap in time with step 40. Since the customer is released at the end of step 40, however, the amount of time taken to transfer the images to the service center at step 42 is generally not critical. The WLAN may therefore operate at a standard IEEE 802.11b rate, such as 11 Mbps, rather than at the EDR prevailing between the camera and the service point. Alternatively, WLAN 22 may also operate at the EDR. Further alternatively, the WLAN in the embodiment of FIG. 1 may be replaced by a wired network.

Service center 32 receives and processes the image files at a hard copy step 44. Typically, the service center produces photographic prints or, alternatively, other media, such as a photo-CD. The finished hard copies are held at a customer service site 34, which is preferably at or adjacent to the service center. The customer goes to site 34 at a pickup step 46, typically when he or she is done shopping and is ready to leave the establishment, and picks up the finished hard copies. The customer is thus able to enjoy the advantage of high-quality hard copies of electronic images, with virtually no time spent waiting for the images to be transferred and only a single stop required at the customer service site to pick them up.

FIG. 3 is a flow chart that schematically illustrates details of image upload step 40, in accordance with a preferred embodiment of the present invention. Communications between service point 24 and the client device (camera 28) are preferably built on a master-slave model, with the service point acting as the master. To initiate the data upload, the client device passes a request to service point 24 to begin EDR service, at a request step 50. This step is preferably carried out by communicating at the minimum standard bandwidth of 1 MHz, most preferably in accordance with Bluetooth networking protocols. (The IEEE 802.11 standards specify only the physical layer [PHY] and a media access control [MAC] sublayer for wireless communications. Bluetooth specifies higher-level protocols, as well, which can operate over IEEE 802.11.)

In response to the client request, service point 24 allocates time slots in which the client device can transmit the image data, at an allocation step 52. The time slots are preferably allocated based on the same model as is used for Bluetooth time slot allocation, so that EDR transmission can co-exist with low-bandwidth Bluetooth communications The service point informs the client device or its time slot allocation in a Bluetooth-standard message. This message is preferably sent to the client at a different frequency from the client message at step 50, in accordance with the Bluetooth protocol.

At an EDR transmission step 54, the client begins transmitting the image files or other data at the enhanced data rate. A large bandwidth, preferably up to 28 MHz, is allocated for this transmission. Most preferably, the client device encodes multiple bits per symbol, at the 11 Msps rate provided by 802.11b, so that the transmission at step 54 takes place at 22 or 33 Mbps. The frequency of transmission is preferably held steady at step 54, as opposed to the above-mentioned frequency hopping that is used at steps 50 and 52. Upon completion of the transmission, service point 24 informs the client camera 28 that all of the data have been received in good order, at an acknowledgment step 56. This step preferably returns to using Bluetooth protocols, at the reduced 1 MHz bandwidth.

Figure 4:
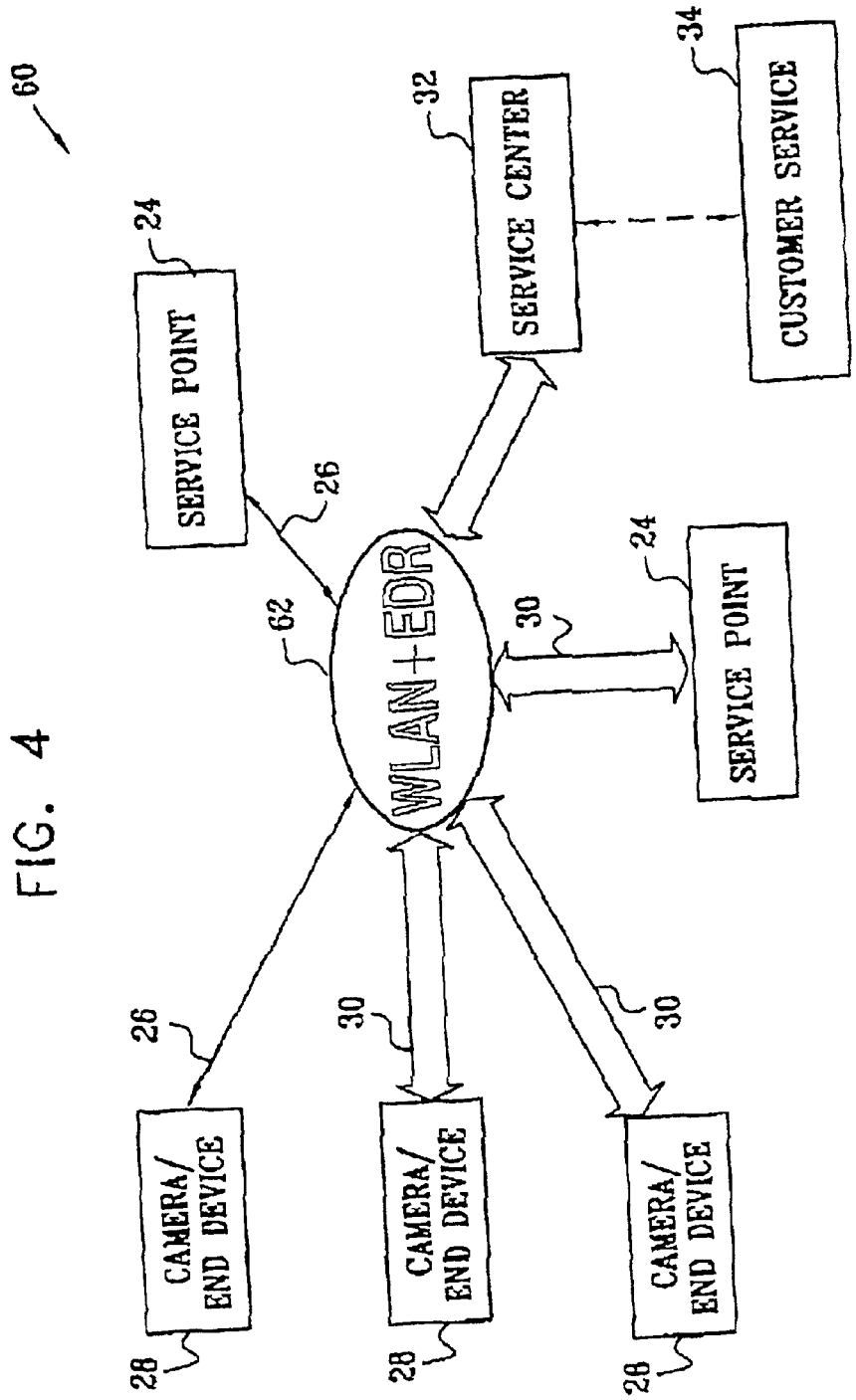
FIG. 4 is a block diagram that schematically illustrates a system, based on a WLAN, for providing hard copies of digital images, in accordance with another preferred embodiment of the present invention.

FIG. 4 is a block diagram that schematically illustrates an alternative system 60 for providing hard copies of digital images, in accordance with another preferred embodiment of the present invention. In this embodiment, a high-speed WLAN 62 is itself adapted for EDR operation. Cameras 28 and other end devices are thus able to connect to WLAN 62 at substantially any point in an area that the WLAN serves, so as to transfer their digital images or other data directly to service center 32 at data rates of 22 Mbps and above. Alternatively, assuming the WLAN to be downward-compatible to the existing data rates of IEEE 802.11b, transmission at 11 Mbps and below is also possible. Aside from these differences, the methods of FIGS. 2 and 3 are similarly applicable in system 60. System 60 may also include service points 26, enabling users to communicate alternatively with the service points or directly with high-speed WLAN 62.

FIG. 5 is a block diagram that schematically illustrates elements of a wireless transmitter 70 for use in an EDR modem, in accordance with a preferred embodiment of the present invention. The elements of transmitter 70 shown in the figure are preferably implemented on a single VLSI chip.

This transmitter is appropriate for use as part of a modem in cameras 28 and service points 24, as well as in other equipment that uses EDR service. A receiver suitable for communicating with transmitter 70 is described hereinbelow with reference to FIG. 8.

Transmitter 70 comprises a convolutional encoder 72, which applies pragmatic trellis coded modulation (PTCM) to encode the data. Details of encoder 72 are shown in FIG. 6 and described with reference thereto. The encoder outputs a stream of two-, three- or four-bit symbols, depending on the data rate of transmission. These symbols are interleaved by an interleaver 74. Alternatively, the bits output by the encoder are interleaved, without regard to the symbols. Optionally, an outer code, such as a Reed-Solomon code, is added to the data in order to enhance the reliability of the transmission.

The interleaved stream of symbols is modulated by a configurable M-PSK modulator 76. The configuration of the modulator is varied depending on the data rate at which transmitter 70 is to operate, as shown in the following table:

TABLE I

| Data rate (Mbps) | Modulation |
| --- | --- |
| 1 | Differential BPSK |
| 2 | Differential QPSK |
| 5.5 | CCK or BPSK/PBCC |
| 11 | CCK or QPSK/PBCC |
| >11 | QPSK, 8PSK or 16PSK |

The modulation schemes for 1–11 Mbps are dictated by the 802.11b standard. The M-PSK schemes used above 11 Mbps enable data to be transmitted at these high bit rates, by sending multiple bits/symbol at the standard symbol rate of 11 Msps, Generally speaking, a wide range of different data rates $R_b$ can be achieved at the fixed symbol rate $R_s$ by varying the order of modulation M and the code rate $R_c$, as given by the equation $R_b = R_s * \log_2(M) * R_c$. Exemplary values are shown in Table II:

TABLE II

| $R_b$(Mbps) | M | $R_s$(Msps) | Code Rate | Technique |
| --- | --- | --- | --- | --- |
| 11 | 4 | 11 | ½ | Regular Code |
| 14.67 | 4 | 11 | ⅔ | Punctured Code |
| 16.5 | 4 | 11 | ¾ | Punctured Code |
| 22 | 4 | 11 | 1 | Punctured Code |
| 16.5 | 8 | 11 | ½ | Regular Code |
| 22 | 8 | 11 | ⅔ | Punctured Code |
| 24.75 | 8 | 11 | ¾ | Punctured Code |
| 27.5 | 8 | 11 | ⅚ | Punctured Code |
| 33 | 8 | 11 | 1 | Punctured Code |
| 22 | 16 | 11 | ½ | Regular code |
| 29.67 | 16 | 11 | ⅔ | Punctured Code |
| 33 | 16 | 11 | ¾ | Punctured Code |
| 36.67 | 16 | 11 | ⅚ | Punctured Code |
| 44 | 16 | 11 | 1 | Punctured Code |

FIG. 6 is a block diagram that schematically illustrates details of convolutional encoder 72, in accordance with a preferred embodiment of the present invention. The input serial bitstream received by transmitter 70 is converted to two-bit parallel form by a serial/parallel converter 80. The actual encoding is then performed by a finite impulse response (FIR) filter 82. In this embodiment, the filter includes six delay stages 84 and two adders 86 and 88. Filter 82 implements a 64-state, rate ½ convolution code giving two output bits $Y_0$ and $Y_1$ for each input bit, with a generator matrix $G = [D^6 + D^5 + D^3 + D^2 + 1, \ D^6 + D^3 + D^2 + D^1 + 1]$. Alternatively, other convolution schemes may be used, as are known in the art.

Together with modulator 76, encoder 72 is configurable depending on the data rate that is chosen.

For example:

At 5.5 Mbps with BPSI modulation, each pair of bits $Y_0$ and $Y_1$ is taken serially so as to produce two BPSK symbols, at ½ input bit/symbol. Transmitting these symbols at the standard rate of 11 Msps gives the 5.5 Mbps data rate.

At 11 Mbps with QPSK modulation, each pair ($Y_0, Y_1$) is used to generate a single symbol.

At 22 Mbps, encoder 72 can operate as a PTCM encoder with a ⅔ rate, i.e., for each two successive input bits, one is fed to filter 82, to generate outputs $Y_0$ and $Y_1$, and the next is passed through directly to $Y_2$, The triplet of output bits ($Y_0, Y_1, Y_2$) is used to generate a single 8 PSK symbol, giving two input bits/symbol. Alternatively, certain bits in outputs $Y_0$ and $Y_1$ may be punctured, as is known in the art, after which the symbols are interleaved and mapped to 8 PSK.

At 33 Mbps, the input data are mapped directly to modulator 76, without convolutional encoding, so as to generate 8 PSK symbols with three input bits/symbol.

Alternative configurations of encoder 72 will be apparent to those skilled in the art. By the same token, 16 PSK could be used to transmit 4 bits/symbol (with appropriate modification to the design of encoder 72), thus yielding a data rates up to 44 Mbps, as long as the quality of the transmission channel is suitable.

FIG. 7 is a polar plot illustrating an 8 PSK constellation that is used in modulator 76, in accordance with a preferred embodiment of the present invention. For each point in the constellation, the corresponding triplet of output bits (for 22 or 33 Mbps operation) is marked in the format ($Y_2, Y_1, Y_0$). Preferably, the modulator applies a cover function to the output symbols, in the form of a pseudo-random phase rotation that is applied to each symbol in the output sequence. For examples the cover function may be determined based on a pseudo-random bit sequence, running at three times the symbol rate. Each successive group of three bits then determines the phase rotation to be applied to the next output symbol.

The pattern of phase rotations is known to the receiver, enabling the receiver to apply the appropriate inverse rotation before demodulating the symbols. The variable rotation of the signal from the transmitter means that the phase of any jamming signal affecting the receiver is effectively randomized. Furthermore, when multiple networks are operating simultaneously, as in the environment of system 20 (FIG. 1), for example, mutual interference between the networks is also randomized, since the cover functions are not synchronized with one another. The use of the cover function thus enhances the data rates that can be achieved in noisy WLAN/EDR environments.

FIG. 8 is a block diagram that schematically illustrates elements of a wireless receiver 100 for use in an EDR modem, in accordance with a preferred embodiment of the present invention. This receiver is designed particularly for use in conjunction with transmitter 70 (FIG. 5), but may alternatively be used with wireless transmitters of other types. Radio signals arriving at receiver 100 are amplified, filtered and digitized by an analog front end (AFE) 102, as is known in the art. A Bluetooth receiver 104 is provided for standard, low-rate communications, such as initiation of EDR service at step 50 in the method of FIG. 3.

Once high-rate service has been established, the digitized samples generated by AFE 102 are rotated in phase, in a rotator/buffer 106, and are then passed to a demodulator 108 for processing. For decoding signals received at standard 802.11b rates, the demodulator preferably comprises a conventional rake and demodulator block 110, as is known in the art. EDR signals, on the other hand, are processed by a M-PSX modern and equalizer block 112. This block can also be configured to demodulate standard 802.11b QPSK signals. Block 112 is configurable to operate at different orders of modulation, preferably including M=4, 8 and 16. Equalized samples output by block 112 are optionally de-interleaved, as appropriate, by a de-interleaver 114. A decoder 116 processes the samples to generate a hard decision output, corresponding to the transmitted bitstream. Preferably, decoder 116 comprises a Viterbi decoder, although other types of trellis decoders may also be used, as are known in the art. The bitstream output by demodulator 108 is then passed to a MAC interface 118 for higher-level processing.

Although preferred embodiments are described herein in relation to transmission of digital images in system 20 or system 60, it will be appreciated that systems and devices of these types can be adapted for use in other applications and services in which large volumes of data must be transferred over wireless networks at high speed. Furthermore, although these preferred embodiments make specific use of inventive extensions to the IEEE 802.11 standard, those skilled in the art will understand that the principles of tho present invention are not tied to one standard or another and may be applied to other standards and methods for high-speed data transmission. It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. A high-speed transmitter for digital data having a variable data rate, the transmitter comprising:
    a convolutional encoder, adapted to generate, for each group of k input bits in a bitstream, n coded output bits, such that k and n are integers, n equal to or greater than k, and at least one of k and n is variable responsive to the variable data rate of the transmitter;
    a modulator, coupled to map the output bits generated by the encoder to a constellation of M symbols for transmission by the transmitter, M an integer, which is variable responsive to the variable data rate of the transmitter; and
    wherein for a given rate Rs of transmission of the symbols by the transmitter, the variable data rate Rb is given by Rb=Rs*log 2(M)*Rc, wherein Rc is a code rate equal to k/n.

2. A transmitter according to claim 1, wherein the rate of transmission of the symbols is substantially fixed at a standard rate.

3. A transmitter according to claim 2, wherein the standard rate is substantially equal to 11 million symbols per second.

4. A transmitter according to claim 1, wherein the constellation comprises a phase-shift-keyed constellation of order M.

5. A transmitter according to claim 4, wherein after mapping the output bits to the symbols, the modulator is adapted to rotate a phase of the symbols in accordance with a pseudo-random cover function.

6. A transmitter according to claim 1, wherein the encoder comprises a sequence of delay stages coupled to receive the input bits in a serial stream, and a plurality of adders, which are coupled to receive the input bits from the delay stages and to add the input bits together so as to generate at least two of the coded output bits in parallel.

7. A transmitter according to claim 6, wherein the modulator is configured to select the coded output bits from the encoder to be mapped to each of the symbols responsive to the variable data rate.

8. A method for variable-rate, high-speed transmission of digital data, comprising:
    specifying a first bit rate at which the data are to be transmitted by a transmitter;
    applying convolutional encoding to the data so as to generate, for each group of k input bits in a bitstream, n coded output bits, such that k and n are integers, n equal to or greater than k;
    modulating the output bits to generate a constellation of M symbols, M a variable integer, for transmission of the modulated data at a given symbol rate and at the first bit rate;
    specifying a second bit rate at which the data are to be transmitted, different from the first bit rate;
    changing a value of at least one of k, n and M, so that after applying the convolutional encoding and modulating the output bits using the changed value, the transmitter transmits the modulated data at the given symbol rate and at the second bit rate; and
    wherein for the given symbol rate Rs, changing the value of at least one of k, n end M comprises changing the value so that the second bit rare Rb is given by Rb=RS*log 2(M)*Rc, wherein Rc is a code rate equal to k/n.

9. A method according to claim 8, wherein the symbol rate is substantially equal to 11 million symbols per second.

10. A method according to claim 8, wherein modulating the output bits comprises applying phase shift keying of order M to generate the symbols.

11. A method according to claim 10, and comprising rotating a phase of the symbols in accordance with a pseudo-random cover function.

12. A method according to claim 8, wherein applying the convolutional encoding comprises passing the input bits in a serial stream through a sequence of delay stages, and adding the input bits from the delay stages together so as to generate at least two of the coded output bits in parallel.

13. A method according to claim 12, wherein modulating the output bits comprises selecting the coded output bits to be mapped to each of the symbols responsive to the variable-rate.

* * * * *